United States Patent
Holsonback et al.

(10) Patent No.: US 9,623,469 B2
(45) Date of Patent: Apr. 18, 2017

(54) HAND HELD FORMING TOOL

(71) Applicant: General Electric Company, Schenectady, NY (US)

(72) Inventors: Erick Randle Holsonback, Spartanburg, SC (US); Jesse Michael Moss, Travelers Rest, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/693,935

(22) Filed: Apr. 23, 2015

(65) Prior Publication Data
US 2016/0311005 A1 Oct. 27, 2016

(51) Int. Cl.
| | |
|---|---|
| *B21D 5/01* | (2006.01) |
| *H01R 43/04* | (2006.01) |
| *B21D 22/02* | (2006.01) |
| *H01R 43/042* | (2006.01) |
| *B21D 53/36* | (2006.01) |
| *B23D 29/02* | (2006.01) |

(52) U.S. Cl.
CPC ............. *B21D 22/02* (2013.01); *B21D 5/01* (2013.01); *B21D 53/36* (2013.01); *B23D 29/026* (2013.01); *H01R 43/0421* (2013.01)

(58) Field of Classification Search
CPC .......... B25B 7/02; B25B 7/22; H01R 43/042; H01R 43/0421; B21D 22/02; B21D 37/12; B21D 39/025; B21D 5/01; B21D 53/26; B23D 29/026

USPC ............. 72/409.05, 409.13, 409.14, 409.18; 81/418, 424.5

See application file for complete search history.

(56) References Cited

U.S. PATENT DOCUMENTS

| | | | |
|---|---|---|---|
| 397,290 A * | 2/1889 | Hiller ................. | H01R 43/0421 140/121 |
| 3,804,132 A | 4/1974 | Mann | |
| 4,353,273 A | 10/1982 | Freberg | |
| 5,513,513 A | 5/1996 | Suess et al. | |
| 6,473,925 B1 | 11/2002 | Konen | |
| 8,176,814 B1 | 5/2012 | Bernstein et al. | |
| 8,776,571 B2 | 7/2014 | Pang | |

FOREIGN PATENT DOCUMENTS

WO WO 2004022430 3/2004

\* cited by examiner

*Primary Examiner* — Teresa M Ekiert
(74) *Attorney, Agent, or Firm* — Dority & Manning, PA

(57) ABSTRACT

A hand held forming tool includes a first arm member having a forming portion that includes a base that is connected to a pressure pad and a bending member. The tool also includes a second arm member pivotally connected to the first arm member. The second arm member includes a die portion. The forming portion and the die portion move between an open and a closed position in response to a force applied to handles of the first and second arm members. The die portion includes a die body having a slot and a bending channel. The slot is complementary to the pressure pad and the bending channel is complementary to the bending member. The tool further includes a shearing plate that is arranged so as to cut a work piece that has been inserted into the slot.

7 Claims, 5 Drawing Sheets

HAND HELD FORMING TOOL

FIELD OF THE INVENTION

The present invention generally relates to a hand held forming tool. More particularly, this invention relates to a hand held forming tool for bending and cutting a metal work piece.

BACKGROUND OF THE INVENTION

Forming or bending a work piece such as sheet metal to form cops, brackets or the like is generally accomplished using large punch dies. The work piece is typically bent first. The bent or formed work piece is then cut in a secondary operation to free the formed work piece from any residual work piece material. However, depending on the work environment, large punch dies may not be available or practical. In addition, the secondary cutting operation may take additional tools and may take additional time. Therefore, an improved forming tool would be desirable in the technology.

BRIEF DESCRIPTION OF THE INVENTION

Aspects and advantages of the invention are set forth below in the following description, or may be obvious from the description, or may be learned through practice of the invention.

One embodiment of the present invention is a hand held forming tool or "tool". The tool includes a first arm member that has a handle portion and a forming portion. The forming portion includes a base that is connected to a pressure pad and a bending member. The pressure pad and the bending member extend outwardly from a bottom side of the base. The tool further includes a second arm member that has a handle portion and a die portion. The first arm member is pivotally connected to the second arm member thus allowing for the forming portion and the die portion to move between an open and a closed position in response to a force applied to the handle portions of the first and second arm members. The die portion comprises a die body having a slot, and a bending channel that each extend inwardly from a top side of the die body. The slot is complementary to the pressure pad and the bending channel is complementary to the bending member. The tool also includes a shearing plate that is arranged to cut a work piece that has been inserted into the slot.

Another embodiment of the present invention is a hand held forming tool or "tool". The tool includes a first arm member that has a handle portion and a forming portion. The forming portion includes a pressure pad and a bending member. The tool also includes a second arm member having a handle portion and a die portion. The first arm member is pivotally connected to the second arm member thus allowing for the forming portion and the die portion to move between an open and a closed position. The die portion comprises a slot and a bending channel that each extend inwardly from a top side of the die portion. The slot is complementary to the pressure pad and the bending channel is complementary to the bending member. A first gap is formed between a contact surface of the pressure pad and a contact surface of the slot and a second gap is formed between a contact wall of the bending member and a contact wall of the bending channel when the hand held forming tool is in the closed position. The tool further includes a shearing plate that is arranged to cut a work piece that has been inserted into the slot and/or the bending channel when the hand held forming tool is in the closed position.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
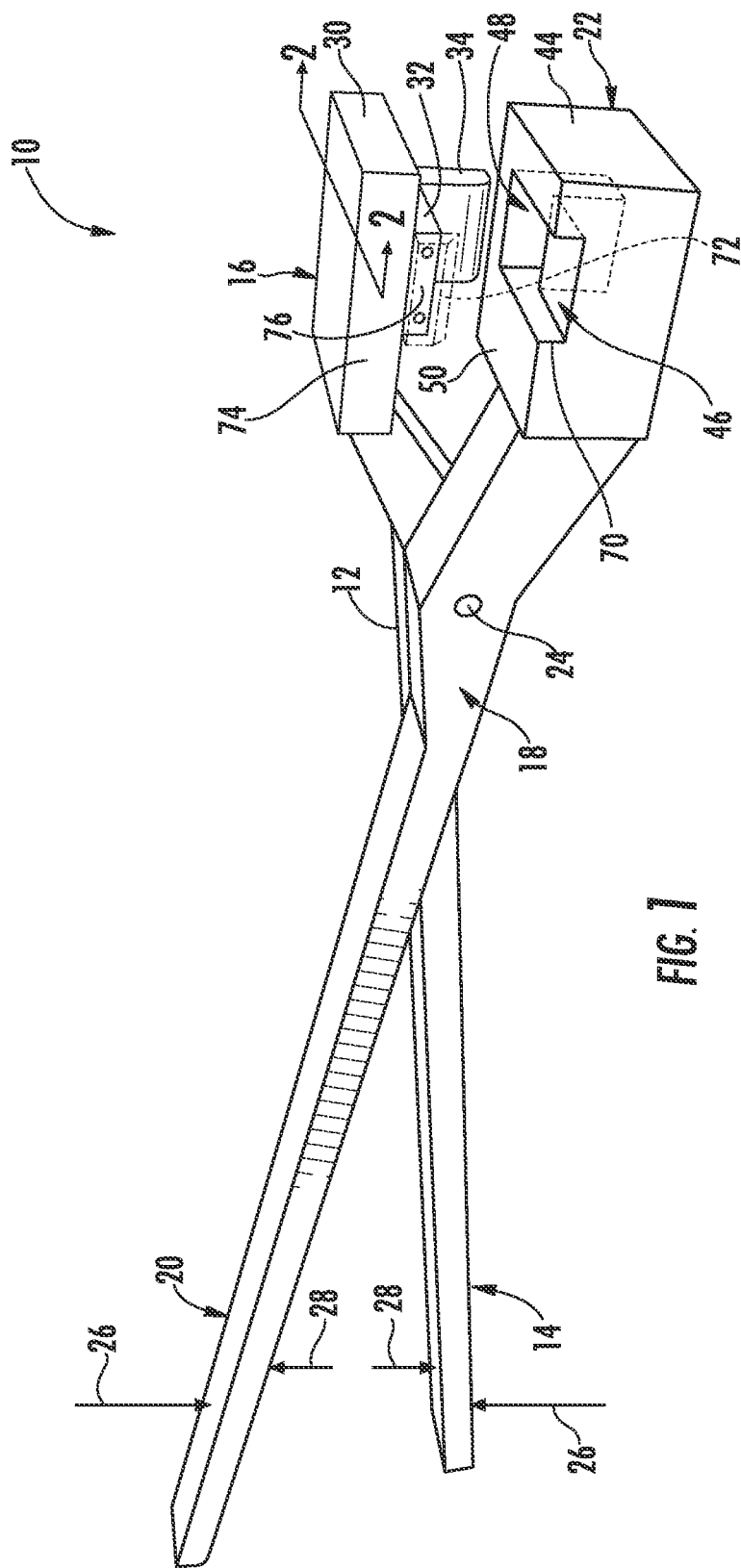
FIG. 1 is a perspective side view of a hand held forming tool according to at least one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 3:
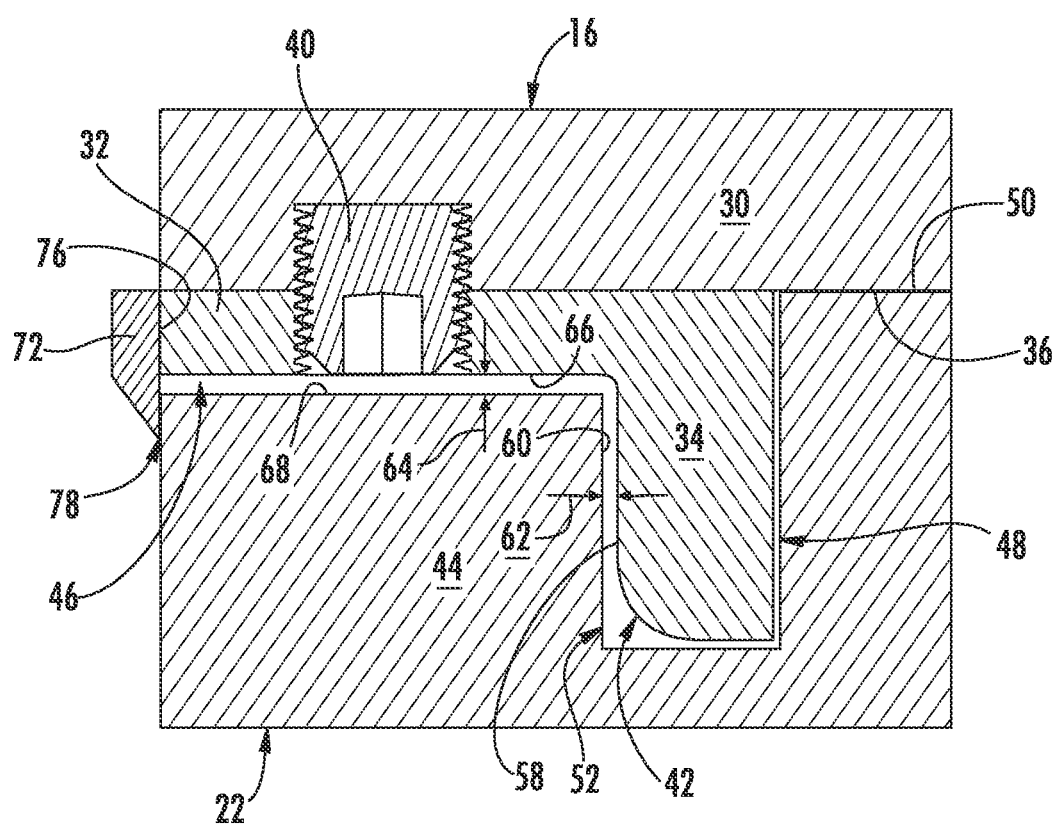
FIG. 3 is a cross sectional front view of the forming portion and the die portion taken along section line 2-2 as shown in FIG. 1 with the tool in a closed position, according to at least one embodiment of the present invention.

Referring now to the drawings, wherein identical numerals indicate the same elements throughout the figures, FIG. 1 provides a perspective side view of a hand held forming tool 10 herein referred to as the "tool" according to at least one embodiment of the present invention. As shown in FIG. 1, the tool 10 includes a first arm member 12 having a handle portion 14 and a forming portion 16. The tool 10 further includes a second arm member 18 having a handle portion 20 and a die portion 22. The first arm member 12 is pivotally connected to the second arm member 18 via a pin 24 or other connecting means allowing for the forming portion 16 and the die portion 22 to move between an open position as shown in FIG. 1 and a closed position as shown in FIG. 3, in response to inward forces 26 or outward forces 28 applied to the handle portions 14, 20 of the first and second arm members 12, 18.

Figure 2:
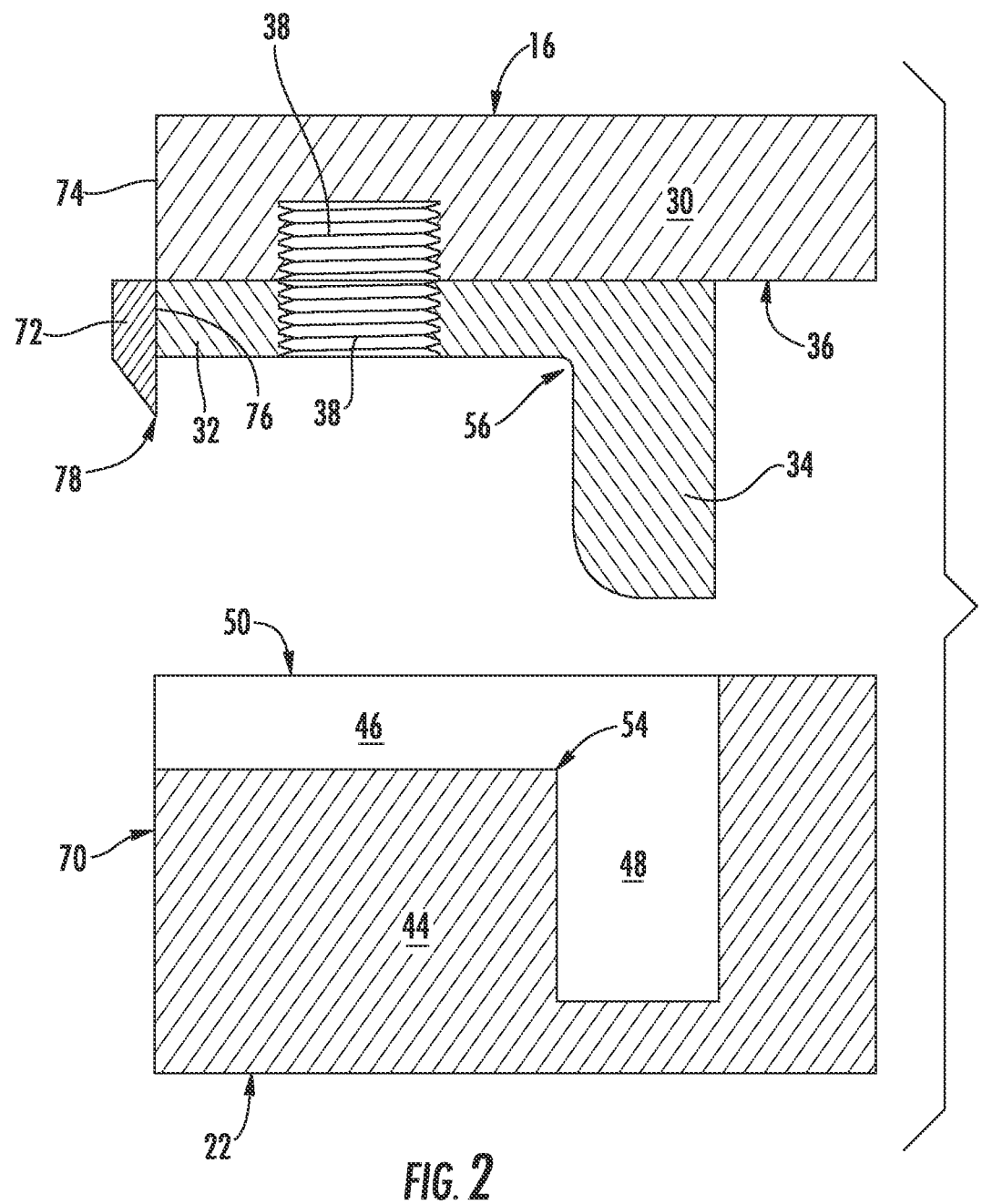
FIG. 2 is a cross sectional front view of a forming portion and a die portion of the hand held forming tool taken along section line 2-2 as shown in FIG. 1 with the tool in an open position, according to at least one embodiment of the present invention.

FIG. 2 provides a cross sectional front view of the forming portion 16 and the die portion 22 taken along section line 2-2 as shown in FIG. 1, according to at least one embodiment of the present invention. FIG. 3 provides a cross sectional front view of the forming portion 16 and the die portion 22 taken along section line 2-2 as shown in FIG. 1 with the tool 10 in a closed position, according to at least one embodiment of the present invention. As shown in FIGS. 1 and 2, the forming portion 16 includes a base 30, a pressure pad 32 and a bending member 34.

As shown in FIG. 2, the pressure pad 32 and the bending member 34 extend outwardly from a bottom side 36 of the base 30. In particular embodiments, the pressure pad 32 and the bending member 34 may be formed as a singular component. In particular embodiments, as shown in FIG. 2, the base 30 and/or the pressure pad 30 may include and/or define complimentary threads 38. In particular embodiments, as shown in FIG. 3, the pressure pad 32 and the bending member 34 may be mechanically fixed to the base 30 via a mechanical fastener 40 such as inset screw or the like. As a result, the pressure pad 32 and/or the bending member 34 may be removed from the base 30, thus allowing for repair and/or replacement of those components. In particular embodiments as shown in FIG. 2, the bending member 34 may have a substantially arcuate or convex leading edge 42.

In various embodiments, as shown in FIGS. 1 and 2, the die portion 22 includes a die body 44. The die body 44 includes and/or defines a slot 46 and a bending channel 48 that each extend inwardly from a top side 50 of the die body 44. The slot 46 is complementary to and/or formed to receive the pressure pad 32 when the tool 10 is in the closed position as shown in FIG. 3. The bending channel 48 is complementary to and/or formed to receive the bending member 34 when the tool 10 is in the closed position as shown in FIG. 3. In particular embodiments, as shown in FIG. 3, the bending channel 48 may have a concave or arcuate bottom portion 52.

In particular embodiments, as shown in FIG. 2, an intersection 54 between the slot 46 and the bending channel 48 may be blended, curved or otherwise formed so as to bend an inner side of a work piece at a desired radii. In particular embodiments, an intersection 56 defined between the pressure pad 32 and the bending member 34 may be blended, curved or otherwise formed so as to bend an outer surface of a work piece at a desired radii. For example, the intersection 54 may be blended, curved or otherwise formed so as to produce a bend radii in a work piece that is complementary to the radii provided at intersection 56. In particular embodiments, the bending member 34, the bending channel 48 and the slot 46 are formed to bend a sheet metal or metal band work piece into an "L" shape.

When the tool 10 is in the closed position as shown in FIG. 3, a contact wall 58 of the bending member 34 is substantially parallel to a contact wall 60 of the bending channel 48. In addition, when the tool 10 is in the closed position, the top side 50 of the die body 44 and the bottom side 36 of the base 30 of the forming portion 16 are substantially parallel. A lateral gap 62 is defined between the contact wall 58 of the bending member 34 and the contact wall 60 of the bending channel 48 when the tool 10 is in the closed position. The lateral gap 62 is generally substantially equal to or greater than a thickness of a work piece that is inserted into the slot 46 and/or the bending channel 48 of the die body 44 of the die portion 22. The lateral gap 62 may be adjusted by replacing the bending member 34 for another having a different geometry. As shown in FIG. 3, a gap 64 is formed between a contact surface 66 of the pressure pad 32 and a contact surface 68 of the slot 46 and/or the die body 44 of the die portion 22.

As shown in FIGS. 1 and 2, the slot 46 may extend through a side or insertion wall 70 of the die body 44 of the die portion 22, thus allowing for an end portion of a work piece to be inserted into the slot 46 and/or the bending channel 48. In various embodiments, as shown in FIGS. 2 and 3, the tool 10 comprises a shearing plate or knife 72. The shearing plate 72 may be fixedly connected to a front side 74 of the base 30 of the forming portion 16. In addition or in the alternative, as shown in FIGS. 2 and 3, the shearing plate 72 may be fixedly connected to a front wall 76 of the pressure pad 32 and may thus be removable with the pressure pad 32 and the bending member 34. The shearing plate 72 generally includes a knife or cutting edge 78. The shearing plate 72, particularly the cutting edge 78 extends below the contact surface 68 of the slot 46 so as to fully cut or shear through a work piece.

Figure 4:
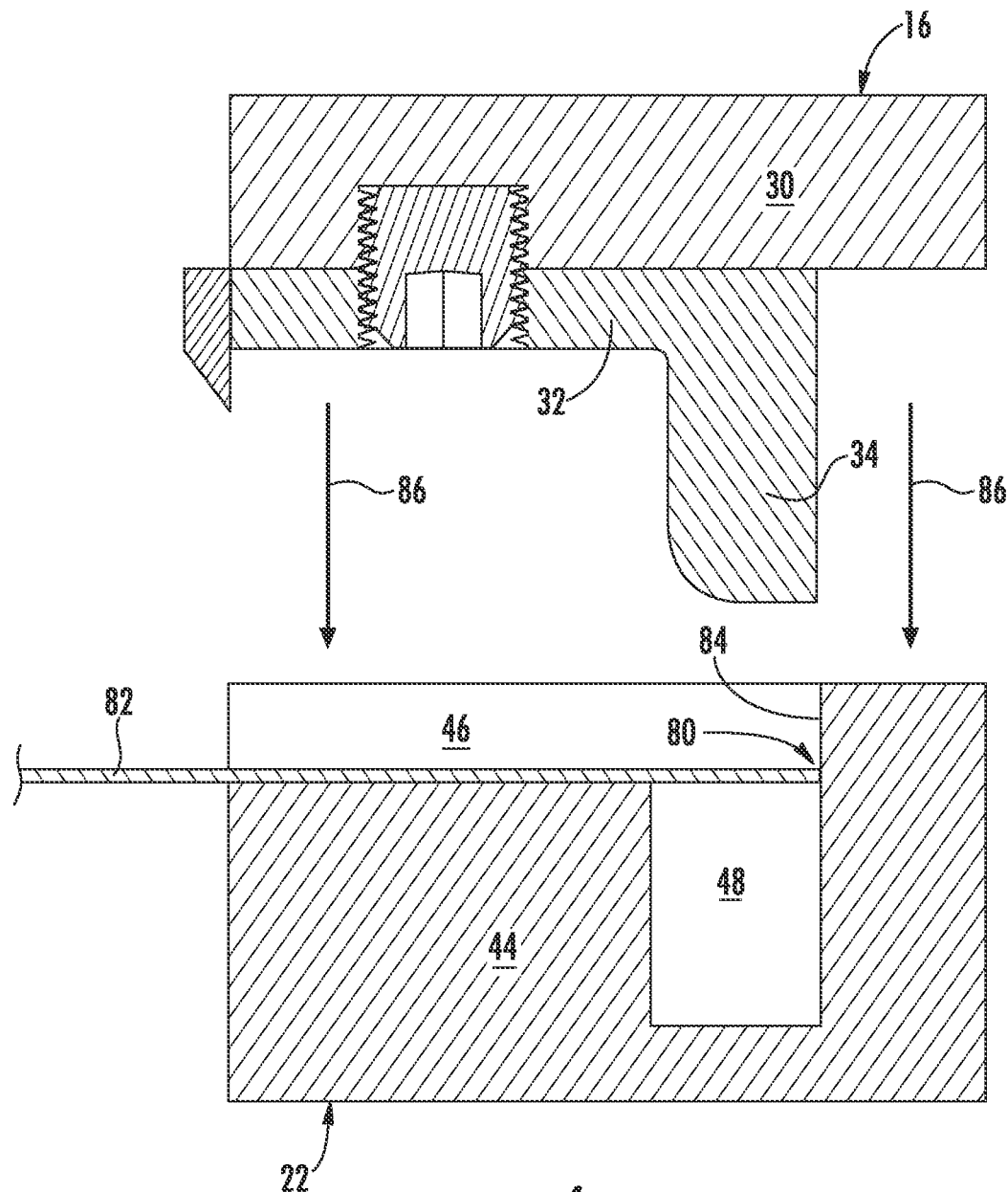
FIG. 4 is a cross sectional front view of a forming portion and a die portion of the hand held forming tool taken along section line 2-2 as shown in FIG. 1 with the tool in an open position, according to at least one embodiment of the present invention.
Figure 5:
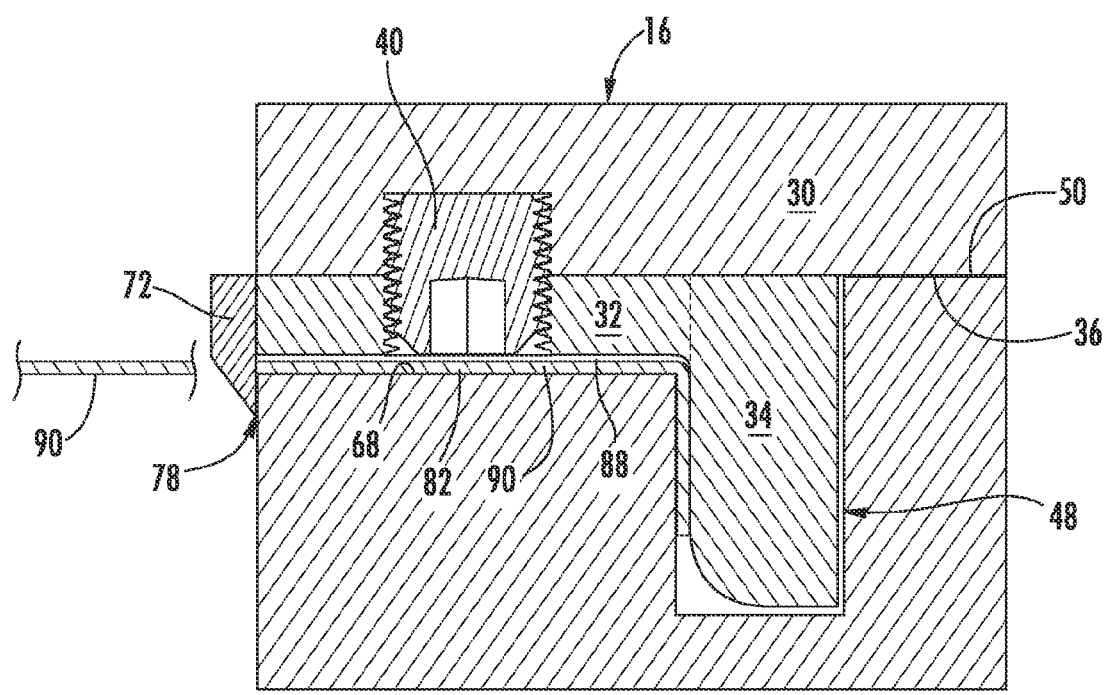
FIG. 5 is a cross sectional front view of the forming portion and the die portion taken along section line 2-2 as shown in FIG. 1 with the tool in a closed position, according to at least one embodiment of the present invention.

FIG. 4 provides a cross sectional front view of the forming portion 16 and the die portion 22 taken along section line 2-2 as shown in FIG. 1, according to at least one embodiment of the present invention. FIG. 5 provides a cross sectional front view of the forming portion 16 and the die portion 22 taken along section line 2-2 as shown in FIG. 1 with the tool 10 in a closed position, according to at least one embodiment of the present invention. In operation, as provided in FIGS. 1-5 collectively, forces 28 are applied to the handle portions 14, 20 to place the tool 10 in an open position as provided in FIGS. 1, 2 and 4. As shown in FIG. 4, a free end 80 of a work piece 82 such as a band of sheet metal is inserted into the slot 46. The free end 80 may be positioned against an inner surface 84 of the die body 44 or may be at least partially inserted into the bending channel 48.

Inward forces 26 (FIG. 1) may then be applied to the handle portions 14, 20, for example, by squeezing the handle portions 14, 20 with a hand, thus causing the forming portion 16 and the die portion 22 to move inwardly as indicated by arrows 86 towards each other. As shown in FIG. 5, bending member 34 is received within bending channel 48 and pressure pad 32 makes contact with an outer surface or side 88 of the work piece 82 and the contact side 68 of the slot 46 makes contact with an inner side or surface 90 of the work piece 82, thus holding work piece 82 in position while bending member 34 travels into bending channel 48, thus forming of bending the work piece 82 into an "L" shape. Simultaneously, shearing plate 72, more particularly, the knife edge 78 of the shearing plate 72 cuts or shears through the work piece 82, thus severing the formed piece from residual work piece material 92.

Tool 10 as illustrated in FIGS. 1-5 and as described herein, provides various technical benefits over current bending or forming tools. For example, by shearing and bending the working piece in one step, operation time is greatly reduced when compared to the time required to bend or form the work piece and then use a separate tool to cut the formed work piece from the residual material. In addition or in the alternative, the ability to remove and replace the pressure pad and/or the bending member from the base 30 of the forming portion 16 provides much desired flexibility with regards to repair of the tool and modifying the tool 10 to accommodate different work piece materials and/or work piece material thicknesses.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed:

1. A hand held forming tool, comprising:
   a pressure pad and a bending member connected to a base of a first arm member, wherein the pressure pad is perpendicular to the bending member;
   a second arm member pivotally connected to the first arm member, the second arm member having a die body defining a slot and a bending channel, wherein a contact surface of the slot is perpendicular to a contact surface of the bending channel;
   wherein the contact surface of the slot is parallel to the pressure pad and the contact surface of the bending channel is parallel to the bending member when the first arm member and the second arm member are in a closed position.

2. The hand held forming tool as in claim 1, further comprising a shearing plate connected to the pressure pad and extending parallel to a front side wall of the base, wherein a knife edge of the shearing plate extends across a portion of a side wall of the die body when the first arm member and the second arm member are in a closed position.

3. The hand held forming tool as in claim 2, wherein the shearing plate is fixedly connected to a front side of the forming portion, wherein the shearing plate extends inwardly past a contact surface of the pressure pad towards the die portion.

4. The hand held forming tool as in claim 1, wherein the bending member, the bending channel, the slot and the shearing plate are oriented to bend a work piece into a L-shape when the first arm member and the second arm member are in a closed position.

5. The hand held forming tool as in claim 1, wherein a first gap is formed between the pressure pad and the contact surface of the slot, and a second gap is formed between the bending member and the contact surface of the bending channel when the first arm member and the second arm member are in a closed position.

6. The hand held forming tool as in claim 1, wherein the bending member has a convex leading edge and the bending channel has a concave bottom portion.

7. The hand held forming tool as in claim 1, wherein the pressure pad is removably connected to the base via an inset screw.

* * * * *